(12) United States Patent
Kim et al.

(10) Patent No.: US 8,748,552 B2
(45) Date of Patent: Jun. 10, 2014

(54) POLYALKYLSILSESQUIOXANE PARTICULATES AND A PREPARATION METHOD THEREOF

(75) Inventors: Jong-Han Kim, Yongin-shi (KR); Seol-A Yu, Yongin-shi (KR); Young-Seo Yoon, Seoul (KR)

(73) Assignee: Kolon Industries, Inc., Kwacheon (KR)

( * ) Notice: Subject to any disclaimer, the term of this patent is extended or adjusted under 35 U.S.C. 154(b) by 58 days.

(21) Appl. No.: 12/599,902

(22) PCT Filed: May 20, 2008

(86) PCT No.: PCT/KR2008/002808
§ 371 (c)(1),
(2), (4) Date: Nov. 12, 2009

(87) PCT Pub. No.: WO2008/147072
PCT Pub. Date: Dec. 4, 2008

(65) Prior Publication Data
US 2010/0256321 A1    Oct. 7, 2010

(30) Foreign Application Priority Data

May 28, 2007 (KR) .................. 10-2007-0051695
Nov. 12, 2007 (KR) .................. 10-2007-0114969

(51) Int. Cl.
*C08G 77/08* (2006.01)

(52) U.S. Cl.
USPC .......................................... 528/14

(58) Field of Classification Search
USPC .......................................... 528/14
See application file for complete search history.

(56) References Cited

U.S. PATENT DOCUMENTS

| 4,528,390 A | * | 7/1985 | Kimura .................. 556/450 |
| 4,895,914 A | * | 1/1990 | Saitoh et al. ............ 525/478 |
| 5,149,748 A | | 9/1992 | Shimizu et al. |
| 5,676,938 A | * | 10/1997 | Kimura et al. ............ 424/78.03 |
| 5,936,031 A | | 8/1999 | Woodgate et al. |

FOREIGN PATENT DOCUMENTS

| CN | 1769323 A | 5/2006 |
| JP | 02-150426 A | 6/1990 |
| JP | 03-244636 A | 10/1991 |
| JP | 04-070335 A | 3/1992 |
| JP | 05-086295 A | 4/1993 |
| JP | 06-33334 B2 | 5/1994 |
| JP | 06-263875 A | 9/1994 |
| JP | 08-113648 A | 5/1996 |
| JP | 2000-186148 A | 7/2000 |
| JP | 2003-002973 A | 1/2003 |
| JP | 2003-049094 A | 2/2003 |
| JP | 2003-080832 A | 3/2003 |
| JP | 2003-183395 A | 7/2003 |
| KR | 1993-0006260 B1 | 4/1993 |
| KR | 1998-024929 A | 7/1998 |

OTHER PUBLICATIONS

JP 2003 002973 Machine translation (2003).*
Database WPI, Week 200367, Thompson Scientific, London, GB; AN 2003-699936, XP002684710, JP 2003-002973 A (Toshiba Silicone KK), Jan. 8, 2003.

* cited by examiner

*Primary Examiner* — Kuo-Liang Peng
(74) *Attorney, Agent, or Firm* — Sughrue Mion, PLLC

(57) ABSTRACT

The present invention relates to polyalkylsilsesquioxane particulates and a method of preparing the same, and more particularly provides the polyalkylsilsesquioxane particulates, of which moisture content is low, water repellency is high, and hygroscopic property in storage is low, and a method of preparing the same by end-capping silanol groups (SiOH) on the surface of the polyalkylsilsesquioxane particulates with alkyl groups by adding an alkoxytrialkylsilane having a triorganosilyl group thereto.

13 Claims, 3 Drawing Sheets

POLYALKYLSILSESQUIOXANE PARTICULATES AND A PREPARATION METHOD THEREOF

CROSS REFERENCES TO RELATED APPLICATION

This application claims priority to and the benefit of Korean Patent Application No. 10-2007-0051695 filed in the Korean Industrial Property Office on May 28, 2007 and Korean Patent Application No. 10-2007-0114969 filed in the Korean Industrial Property Office on Nov. 12, 2007, which are hereby incorporated by reference for all purpose as if fully set forth herein.

BACKGROUND OF THE INVENTION (a) Field of the Invention

The present invention relates to polyalkylsilsesquioxane particulates and a method of preparing the same, and more particularly to polyalkylsilsesquioxane particulates that can be used as a diffusing agent or various additives because of their low moisture content and low content of surface silanol groups, and a method of preparing the same.

(b) Description of the Related Art

Since polyalkylsilsesquioxane particulates have a cross-linked structure of a dense 3-dimensional network, the particulates have a low specific gravity in comparison with an organic polymer and there is no gravimetric change until 400° C., and moreover the particulates have excellent heat-resisting property and mobility.

Polyalkylsilsesquioxane has been generally known since soluble polyphenylsilsesquioxane was first synthesized in the nineteen-sixties by Brown, Jr. et al. of GE Co., Ltd. Polyalkylsilsesquioxane is a common name of all compounds having an empirical formula of $RSiO_{3/2}$, wherein R is hydrogen, an arbitrary alkyl, an alkylene, an aryl, an arylene, or organic functional derivatives including the same.

As a method of preparing the polyalkylsilsesquioxane particulates, which are well known as silicone resin powder, a method of hydrolyzing and polycondensing a tri-functional silane, such as an organotrichlorosilane and an organotrialkoxysilane, was suggested.

Japan patent publication Hei 4-70335 discloses a method of hydrolyzing and polycondensing a methyltrialkoxysilane and/or a partial hydrolysis-condensate thereof and ammonia or an aqueous solution of an amine while slowly stirring it so as to maintain a layered state, in which the methyltrialkoxysilane and/or the partial hydrolysis-condensate thereof constitutes the upper layer. However, it is very difficult to control the stirring speed and maintain the interface of the hydrolysis-polycondensation reaction in such method, and the method has a disadvantage in that the efficiency of production in terms of polymerization time and device volume is low because there is little occasion for contacting with an alkali and thus the reaction speed is slow.

Korea patent publication No. 1993-0006260 discloses a method of hydrolyzing an organotrialkoxysilane in the presence of an organic acid, adding a solution of water/alcohol and subsequently a basic aqueous solution thereto, and condensing the same in a stationary state. By such method, particulates that do not form coagulations can be obtained with a low concentration of catalysts, but it is not suitable for producing particulates having a diameter of 1 µm or more.

Korea patent publication No. 1998-0024929, also, discloses a method of hydrolyzing and condensing an organotrialkoxysilane in an aqueous solution including an anionic surfactant, a polymer stabilizing agent, and a hydroxyl base. In the method, particulates that do not form coagulations can be obtained with a low concentration of catalysts by adding a dispersing stabilizer, but it is difficult to obtain reproducibility of the prepared particle size with a low concentration of catalysts, and the method has disadvantages in that the efficiency of production is low because the organotrialkoxysilane, which is a solid part of the raw material, cannot be used much in order to prevent the formation of coagulations, and the amount of residual silanol is substantial.

To solve the problems, Japan patent publication Hei 2-150426 discloses a method of treating the surface of polymethylsilsesquioxane particulates with a silylating agent including polyfluoroalkyl groups, and Japan patent publication Hei 3-244636 provides a method of treating the surface of silsesquioxane particulates with hexamethyldisilazane and/or divinyltetramethyldisilazane in water. However, the silicone particulates obtained by these methods are not sufficiently improved in terms of water repellency and need to be handled with care during the storage of products because their hygroscopic property in storage is increased.

Therefore, when the polyalkylsilsesquioxane particles prepared by the prior arts are mixed and used with various rubbers or plastics, the problem of a high hygroscopic property in storage may be caused because the water repellency thereof is low and the moisture content is high because of the silanol groups on the surface of the polyalkylsilsesquioxane particles.

SUMMARY OF THE INVENTION

In a process of research for preventing the problem of a high hygroscopic property in storage of polyalkylsilsesquioxane particulates, the present inventors found that polyalkylsilsesquioxane particulates having a low hygroscopic property in storage owing to high water repellency and low moisture content could be made by end-capping a small quantity of silanol groups (SiOH) on the surface of spherical polyalkylsilsesquioxane particulates with alkyl groups by adding an alkoxytrialkylsilane including a triorganosilyl group thereto, and accomplished the present invention.

Therefore, it is an aspect of the present invention to provide polyalkylsilsesquioxane particulates having an improved hygroscopic property in storage, and a method of preparing the same.

In order to attain the object, the present invention provides one embodiment of the polyalkylsilsesquioxane particulates represented by the following Chemical Formula 4:

$RSiO_{(4-m)/2}$  [Chemical Formula 4]

wherein

R is a non-hydrolyzable group, which is a $C_1$-$C_{20}$ alkyl group, a $C_1$-$C_{20}$ alkyl group having a (meth)acryloyloxy group or an epoxy group, a $C_2$-$C_{20}$ alkenyl group, a $C_6$-$C_{20}$ aryl group or a $C_7$-$C_{20}$ aralkyl group, and m is an integer of from 0 to 3.

Considering the reactivity of hydrolysis, it is preferable that the polyalkylsilsesquioxane is spherical particulates consisting of methylsilsesquioxane represented by the following average unit formula of Chemical Formula 4-1:

$CH_3SiO_{3/2}$.  [Chemical Formula 4-1]

The polyalkylsilsesquioxane particulates of the present invention may be obtained by end-capping the silanol groups on their surface by adding an alkoxytrialkylsilane into a suspension or a dispersion of the polyalkylsilsesquioxane particulates having the silanol groups on their surface, wherein the dispersion is prepared by drying and re-dispersing the particulates. The spherical polyalkylsilsesquioxane particulates have a diameter of 1 μm or more, which is larger than that of usual particles, and their hygroscopic property in storage is low because of their low moisture content and high water repellency.

The present invention provides another embodiment of a method of preparing polyalkylsilsesquioxane particulates including the following steps:

the first step of preparing an alkylsilanetriol represented by the following Chemical Formula 2 or a partial hydrolysate thereof by hydrolyzing an alkyltrialkoxysilane represented by the following Chemical Formula 1;

the second step of preparing polyalkylsilsesquioxane particulates having silanol groups on their surface by polycondensing the alkylsilanetriol or the partial hydrolysate thereof; and the third step of end-capping the silanol groups with alkyl groups by adding an alkoxytrialkylsilane selected from the group consisting of the compounds represented by the following Chemical Formula 3 to the polyalkylsilsesquioxane particulates,

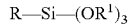
R—Si—(OR$^1$)$_3$     [Chemical Formula 1]

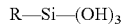
R—Si—(OH)$_3$     [Chemical Formula 2]

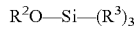
R$^2$O—Si—(R$^3$)$_3$     [Chemical Formula 3]

wherein

R and R$^3$ are respectively a non-hydrolyzable group, which is a C$_1$-C$_{20}$ alkyl group, a C$_1$-C$_{20}$ alkyl group having a (meth)acryloyloxy group or an epoxy group, a C$_2$-C$_{20}$ alkenyl group, a C$_6$-C$_{20}$ aryl group or a C$_7$-C$_{20}$ aralkyl group, and R$^1$ and R$^2$ are respectively a hydrolyzable group, which is a C$_1$-C$_6$ alkyl group.

Hereinafter, the present invention is explained in more detail.

The 1$^{st}$ Step

The first step of the present method is a process for obtaining the alkylsilanetriol represented by Chemical Formula 2 or the partial hydrolysate thereof by the hydrolysis reaction of the alkyltrialkoxysilane represented by Chemical Formula 1 in the presence of an organic acid after preparing a homogeneous aqueous solution by adding an aqueous medium thereto.

Considering the reactivity, the alkyltrialkoxysilane compound of Chemical Formula 1 is preferably an alkyltrialkoxysilane having a C$_1$-C$_{20}$ alkyl group or a C$_2$-C$_{20}$ alkenyl group, and is more preferably one compound or two or more compounds selected from the group consisting of methyltrimethoxysilane, methyltriethoxysilane, methyltripropoxysilane, methyltriisopropoxysilane, ethyltrimethoxysilane, ethyltriethoxysilane, propyltrimethoxysilane, propyltriethoxysilane, butyltrimethoxysilane, phenyltrimethoxysilane, phenyltriethoxysilane, vinyltrimethoxysilane, vinyltriethoxysilane, γ-glycidoxypropyltrimethoxysilane, γ-acryloyloxypropyltrimethoxysilane, γ-methacryloxypropyltrimethoxysilane, dimethyldimethoxysilane, and methylphenyldimethoxysilane. The compound of Chemical Formula 1 is not particularly limited, but methyltrimethoxysilane, methyltriethoxysilane, vinyltrimethoxysilane, and phenyltrimethoxysilane may be used, and methyltrimethoxysilane is particularly preferable because of its higher reactivity.

The amount of the alkyltrialkoxysilane of Chemical Formula 1 used varies with the content of the aqueous medium and the kinds and concentration of the organic acid and the base catalyst. Specifically, the amount of the alkyltrialkoxysilane is preferably 100 parts by weight or less per 100 parts by weight of the aqueous medium used in the first step reaction, more preferably from 1.0 to 90 parts by weight, and most preferably from 5.0 to 80 parts by weight. When the amount of the alkyltrialkoxysilane is over 90 parts by weight, it is easy to generate the coagulation or aggregation of the particles when they are used, and when the amount is below 1.0 part by weight, the efficiency of production deteriorates because the concentration of the polyalkylsilsesquioxane particulates prepared finally in the aqueous solution is too low.

As the aqueous medium used in the hydrolysis of the alkyltrialkoxysilane, ion-exchanged water or a mixture of ion-exchanged water and a water-miscible organic solvent may be used. This is preferable as fewer cations are present in the ion-exchanged water, and it is more preferable that the ion-exchanged water is ultra-pure water of which the resistance measured under a nitrogen stream prepared by passing through an ion-exchanger is 5 mega ohm (MΩ) or more. As the water-miscible organic solvent, one compound or two or more compounds selected from the group consisting of aliphatic alcohols such as methanol, ethanol, 1-propanol, 2-propanol, isopropanol, and the like; and ketones such as acetonitrile, acetone, dimethylketone, methylethylketone, and the like, may be used.

Considering the exothermic temperature of the reaction, the amount of the aqueous medium used in the hydrolysis reaction of the first step is preferably from 50 to 1400 parts by weight per 100 parts by weight of the alkyltrialkoxysilane.

Furthermore, hydrochloric acid, sulfuric acid, formic acid, acetic acid, propionic acid, oxalic acid, citric acid, and the like may be used as the organic acid catalyst for the hydrolysis of the alkyltrialkoxysilane. The amount of the organic acid catalyst used is preferably from 0.001 to 1 part by weight per 100 parts by weight of the aqueous medium. When the amount of the organic acid catalyst is below 0.001 parts by weight, the hydrolysis reaction is not carried out sufficiently, and when the amount is over 1 part by weight, the reaction efficiency to the input falls as the content of the organic acid increases.

The 2$^{nd}$ Step

The second step of the present method is a step of preparing the polyalkylsilsesquioxane particulates having silanol groups on their surface by polycondensing the alkylsilanetriol represented by Chemical Formula 2 or the partial hydrolysate thereof obtained in the first step in the presence of a base catalyst.

The base catalyst in the present method is used as a catalyst for the polycondensation reaction and also for neutralizing the organic acid catalyst of the partial hydrolysate of the alkyltrialkoxysilane of Chemical Formula 1. As examples of the base catalyst, one or more base catalyst selected from the group consisting of alkali metal hydroxides such as potassium hydroxide, sodium hydroxide, lithium hydroxide, and the like; alkaline earth metal hydroxides such as calcium hydroxide, barium hydroxide, and the like; alkali metal carbonates such as potassium carbonate, sodium carbonate, and the like; and amines such as monomethylamine, dimethylamine, monoethylamine, diethylamine, ethylenediamine, ammonia, and the like may be preferably used, individually or in combination of two or more. However, it is most preferable to use ammonia, which is superior in water-solubility and catalytic activity, has low toxicity, is easy to remove, and is particularly low priced. The amount of the base catalyst used is preferably from 0.05 to 3 parts by weight per 100 parts by weight of the alkylsilanetriol or the partial hydrolysate thereof obtained in the first step.

After adding the base catalyst, pH of the aqueous solution is preferably from 9.0 to 13.0, and more preferably from 9.5 to 12.0. When the pH is less than 9, the reaction speed of the polycondensation is reduced and the aqueous suspension may gel because the particles are easy to coagulate and aggregate with each other, and when the pH is over 13.0, the reaction speed of the polycondensation of the organotrialkoxysilane increases, but the reaction efficiency the input is reduced and the yield is low because indeterminate gels are formed.

Also, considering the exothermic temperature of the reaction, it is preferable that the amount of the aqueous medium, which is used in the polycondensation reaction of the second step, is from 50 to 500 parts by weight per 100 parts by weight of the alkylsilanetriol or the partial hydrolysate thereof obtained in the first step.

The $3^{rd}$ Step

The third step of the present method is a process of obtaining the polyalkylsilsesquioxane particulates, of which the content of silanol groups on their surface is reduced to 5% or less and preferably to 0.05 to 5%, by end-capping the silanol groups with alkyl groups by adding an alkoxytrialkylsilane represented by Chemical Formula 3 to the polyalkylsilsesquioxane particulates having silanol groups on their surface that are obtained in the second step.

The polyalkylsilsesquioxane particulates obtained in the second step of the present method are preferably used in the form of a powder obtained by drying after the second step, and are also preferably used in the form of a re-dispersed solution of the powder or an aqueous suspension of the polyalkylsilsesquioxane particulates as is.

As the alkoxytrialkylsilane compound of Chemical Formula 3, it is preferable that an alkoxytrialkylsilane having a $C_1$-$C_{20}$ alkyl group or a $C_2$-$C_{20}$ alkenyl group is used. Examples of the alkoxytrialkylsilane compound are represented by Chemical Formula 3, and more preferably one or more compounds selected from the group consisting of trimethylmethoxysilane, trimethylethoxysilane, trimethylpropoxysilane, trimethylisopropoxysilane, trimethylbutoxysilane, trimethylpentoxysilane, triethylmethoxysilane, tripropylethoxysilane, triethylethoxysilane, tripropylmethoxysilane, tributylmethoxysilane, triphenylmethoxysilane, triphenylethoxysilane, trivinylmethoxysilane, trivinylethoxysilane, and vinylmethylmethoxysilane may be used individually or by combination of two or more. Among the compounds, trimethylmethoxysilane and trivinylmethoxysilane are preferable, and trimethylmethoxysilane is particularly preferable considering the reactivity.

The amount of the alkoxytrialkylsilane of Chemical Formula 3 used varies with the kinds and amount of the alkyltrialkoxysilane. Specifically, the amount of the alkoxytrialkylsilane used is 10 parts by weight or less per 100 parts by weight of the alkyltrialkoxysilane of Chemical Formula 1, preferably from 0.1 to 10 parts by weight, and more preferably from 0.5 to 5 parts by weight. When the amount of the alkoxytrialkylsilane used is over 10 parts by weight, it is easy to generate by-products such as an alkoxytrialkylsilane dimmer because the amount is over the amount for obtaining an adequate end-capping effect and it is also easy to obtain a broad particle size distribution because of coagulation or aggregation between the particulates. Also, when the amount is less than 0.1 parts by weight, the end-capping is not sufficiently done.

For the present invention, further, the reaction temperature of the individual steps is influenced by the kinds and amount of the organic silane compound used, and is preferably in the temperature range of from 0 to 50° C. Herein, when the reaction temperature is less than 0° C., the aqueous medium freezes and it is difficult to carry out the polymerization, and when the temperature is over 50° C., the yield deteriorates.

Furthermore, it is possible to produce the polyalkylsilsesquioxane particulates having an intended size by controlling the range of the reaction temperature. That is, when it is intended to produce relatively large particulates with a diameter of about 10 to 30 μm, it is preferable to carry out the reaction in the temperature range of from 5 to 30° C., and when it is intended to produce relatively small particulates with a diameter of about 1 to 10 μm, it is preferable to carry out the reaction in the temperature range of from 30 to 40° C.

Also, for the present invention, in a case in which the amount of the alkyltrialkoxysilane used is excessive, when the stirring is too strong during the hydrolysis and the polycondensation reaction the particulates tend to coagulate or aggregate with each other, and thus it is preferable to stir the solution with a mild condition as soon as possible. The spherical polyalkylsilsesquioxane particulates prepared in this manner are filtered after the termination of the reaction, and then they are washed and dried. According to circumstances, as an example, when the particulates are coagulated during the drying process, it is preferable to carry out a pulverizing process with a mill such as a jet mill, a ball mill, or a hammer mill.

The polyalkylsilsesquioxane particulates obtained by the method have silanol groups on their surface in an amount of 5% or less. The particulates of the present invention satisfying the content of the silanol groups have high stability in storage because of a low hygroscopic property thereof, and have few problems such as generating an embossment and the like and do not exert a negative influence upon the final product when they are mixed with intended articles, for example a diffusion plate, a diffusion film, and the like. Furthermore, since the content of the silanol groups to the methyl groups on their surface is decreased, the particulates of the present invention satisfying the content of the silanol groups may have a thermogravimetric change rate of 2.7% or less at 400° C. Herein, it is not preferable for the thermogravimetric change rate thereof to be 2.7% or more because the thermal resistance of the particulates is deteriorated and the properties of the product may be affected, when the particulates are applied to a material requiring high thermal resistance at 200° C. or more.

The polyalkylsilsesquioxane particulates of the present invention are suitable to be used as a light diffusing agent for a light diffusion film and a light diffusion plate of a backlight unit (BLU) in the field of display materials; an agent for imparting a surface lubricant property, water repellency, or oil repellency, and an anti-blocking agent for a plastic film in the field of coating materials; and an additive for paints and cosmetics, because they have a low hygroscopic property in storage owing to their low moisture content and high water repellency and have a volume average diameter of 1 to 30 μm.

DETAILED DESCRIPTION OF THE EMBODIMENTS

Figure 1:
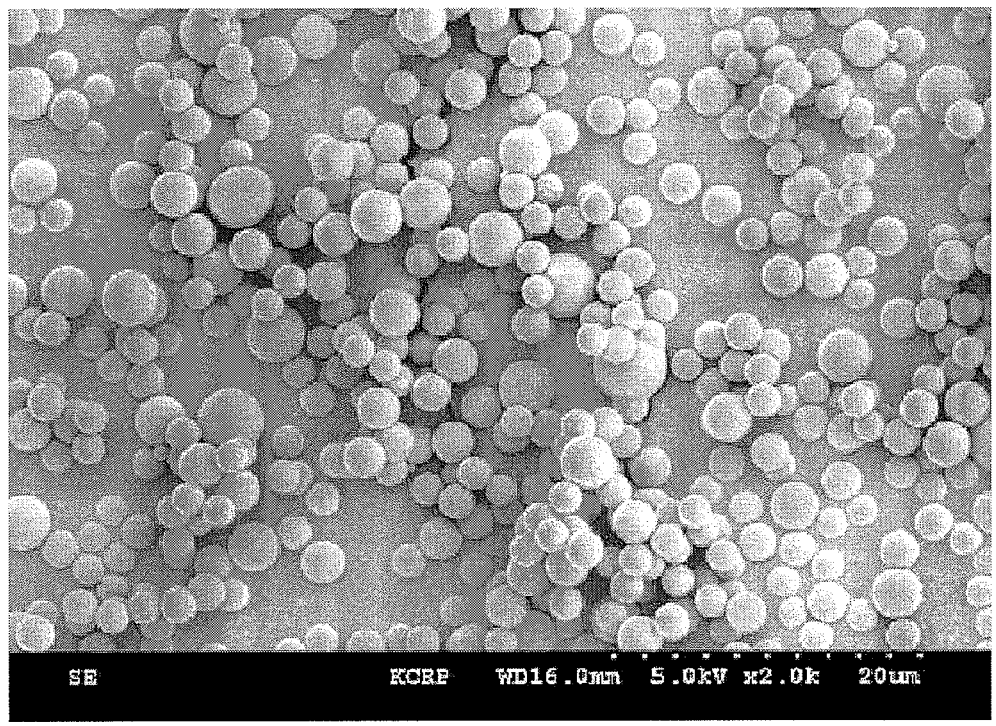
FIG. 1 is a photograph representing the particle structure of the polymethylsilsesquioxane particulates of Example 1.
Figure 2:
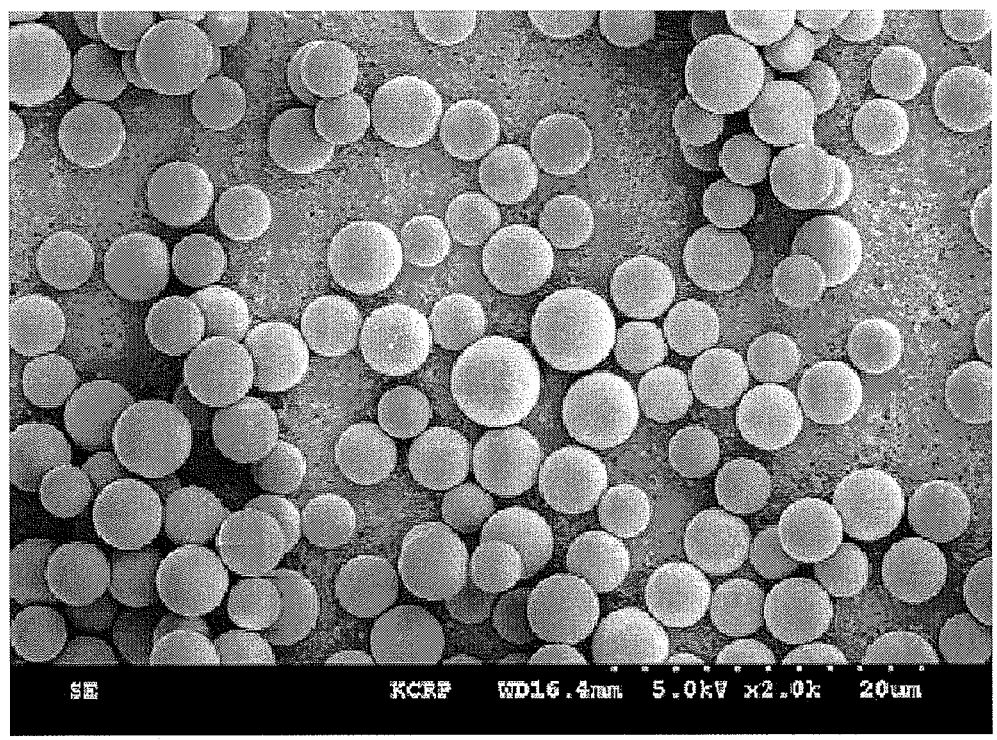
FIG. 2 is a photograph representing the particle structure of the polymethylsilsesquioxane particulates of Example 5.
Figure 3:
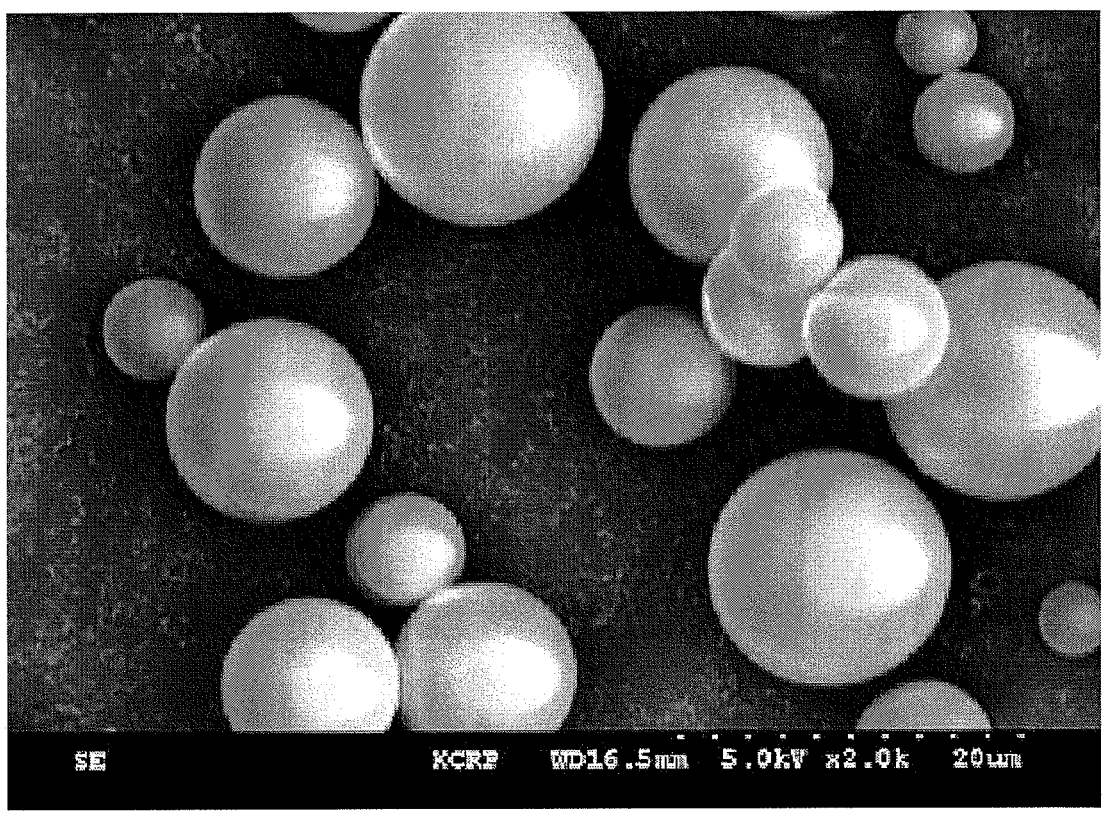
FIG. 3 is a photograph representing the particle structure of the polymethylsilsesquioxane particulates of Example 6.

Hereinafter, the present invention is described in further detail through examples and comparative examples below.

However, the following examples are only for the understanding of the present invention and the present invention is not limited to or by them.

EXAMPLES

In the following examples and comparative examples, the yield is represented by [polyalkylsilsesquioxane/alkyltrialkoxysilane] (mol %), and the coefficient of variation (CV) is obtained according to the following Calculation Formula 1 by using an apparatus for measuring a particle size distribution (Multisizer3, Coulter Electronics Co.).

$$CV(\%)=(\text{standard deviation of diameter/average diameter of particles})\times 100 \quad \text{[Calculation Formula 1]}$$

Example 1

The polyalkylsilsesquioxane particulates were prepared by the following steps.

The 1$^{st}$ Step

After introducing 950 parts by weight of ion-exchanged water and 0.3 parts by weight of acetic acid into a round 2 L flask and dissolving them so that pH thereof was 2 to 4,600 parts by weight of methyltrimethoxysilane was introduced therein. The solution was stirred at 200 rpm, after purging with nitrogen for 5 minutes. The inner temperature of the mixed solution was elevated to 42° C. after 3 minutes, and the methyltrimethoxysilane was completely dissolved and an alkylsilanetriol or a partial hydrolysate thereof was obtained in the form of a homogeneous solution after about 3 hours.

The number-average molecular weight of the alkylsilanetriol or the partial hydrolysate thereof was analyzed with a water model 150 GPC by using tetrahydrofurane (THF) solvent, and the number-average molecular weight was 430.

The 2$^{nd}$ Step 500 parts by weight of the alkylsilanetriol or the partial hydrolysate thereof obtained in the first step was added to an aqueous solution of pH 9 to 12, which was prepared by introducing 20 parts by weight of 29% aqueous ammonia solution into 700 parts by weight of ion-exchanged water, at once. The solution was stirred at 150 rpm for 5 minutes at a reaction temperature of 35° C. and left in a stationary state for 3 hours after white opaqueness appeared, and then a polycondensation reaction was carried out so as to prepare the polyalkylsilsesquioxane particulates.

The 3$^{rd}$ Step 3.8 parts by weight of trimethylmethoxysilane was added into the white suspension of the polyalkylsilsesquioxane particulates prepared in the second step. After leaving it for 12 hours, the composition was passed through a wire mesh (200 mesh), washed and rinsed with methanol several times, and dried so as to be a cake of powder. The cake was dried at 105° C. for 4 hours in a heating air circulation drier and pulverized with a jet mill so that the polymethylsilsesquioxane particulates were obtained in the form of a white powder.

The yield of the particulates obtained by the polymerization was 99.7 mol %, the average diameter ($d_{50}$) was 2.3 μm, and the coefficient of variation (CV) of the diameter was 20.5%.

Various properties of the prepared polymethylsilsesquioxane particulates were measured according to conventional methods, and the results are listed in the following Table 1.

Figure 4:
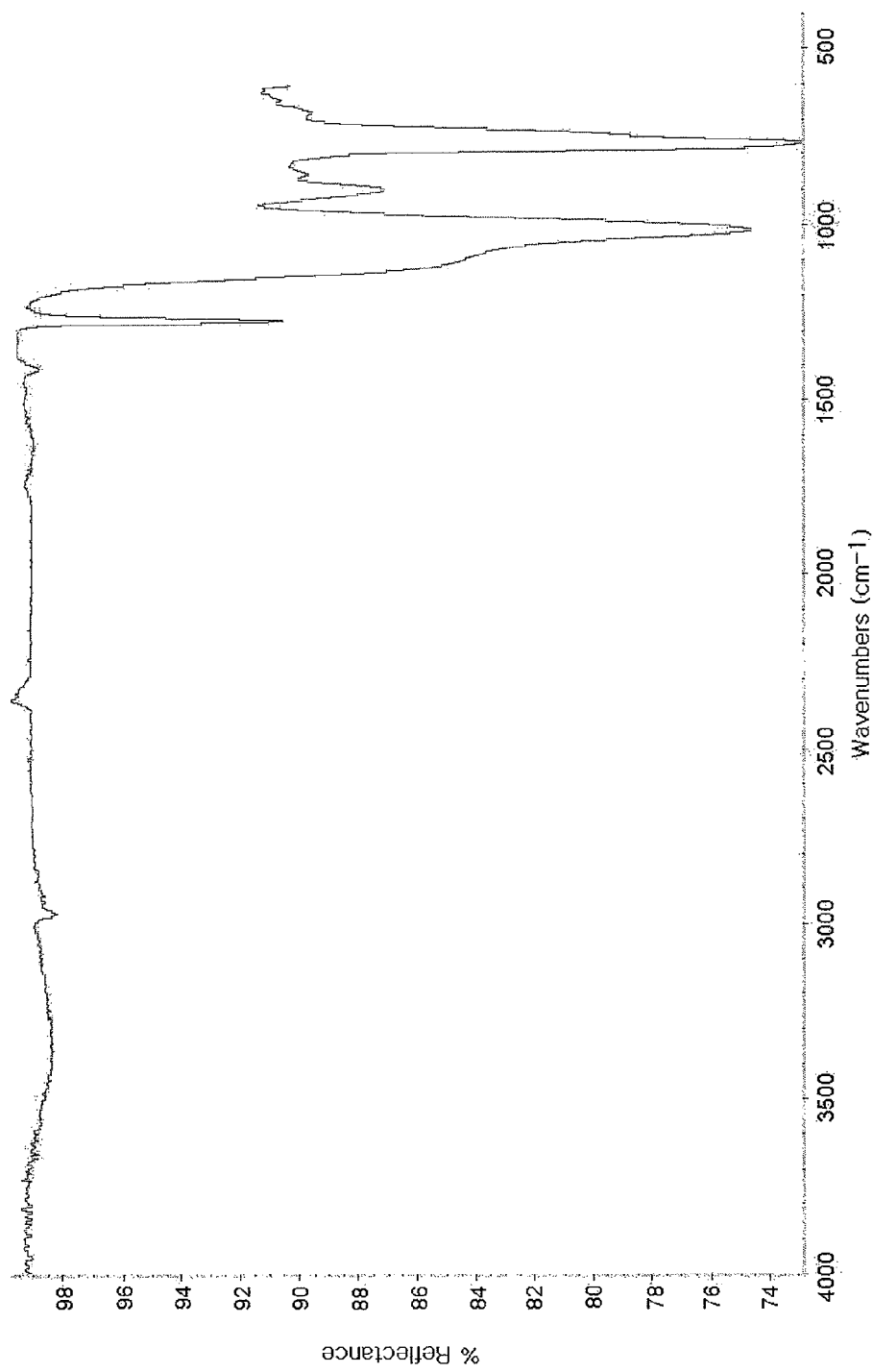
FIG. 4 is a photograph representing FT-IR spectrum of the polymethylsilsesquioxane particulates of Example 1.

The FT-IR spectrum of the particulates obtained in Example 1 was measured by using a JASCO FT/IR 230 according to a KBr tablet method, and the results are illustrated in FIG. 4. In the results, we can find the absorption peak of Si—O—Si at 1000 to 1200 cm$^{-1}$ and the absorption peaks of Si—CH$_3$ at 1280 cm$^{-1}$ and 780 cm$^{-1}$.

Example 2

The polyalkylsilsesquioxane particulates were prepared substantially according to the same method as in Example 1, except that vinyltrimethoxysilane was used instead of methyltrimethoxysilane, and the properties of the prepared polyalkylsilsesquioxane particulates were measured according to conventional methods and the results are listed in the following Table 1.

Example 3

The polyalkylsilsesquioxane particulates were prepared substantially according to the same method as in Example 1, except that vinylmethylmethoxysilane was used instead of trimethylmethoxysilane, and the properties of the prepared polyalkylsilsesquioxane particulates were measured according to conventional methods and the results are listed in the following Table 1.

Example 4

The polyalkylsilsesquioxane particulates were prepared substantially according to the same method as in Example 2, except that vinylmethylmethoxysilane was used instead of trimethylmethoxysilane, and the properties of the prepared polyalkylsilsesquioxane particulates were measured according to conventional methods and the results are listed in the following Table 1.

Example 5

The polyalkylsilsesquioxane particulates were prepared substantially according to the same method as in Example 1, except that the reaction temperature of the second step was 5° C.

The yield of the particulates obtained by the polymerization was 99.5 mol %, the average diameter ($d_{50}$) was 5.5 μm, and the coefficient of variation (CV) of the diameter was 14.3%.

The properties of the prepared polyalkylsilsesquioxane particulates were measured according to conventional methods, and the results are listed in the following Table 1.

Example 6

The polyalkylsilsesquioxane particulates were prepared substantially according to the same method as in Example 5, except that vinyltrimethoxysilane was used instead of methyltrimethoxysilane, and the properties of the prepared polyalkylsilsesquioxane particulates were measured according to conventional methods and the results are listed in the following Table 1.

Example 7

The polyalkylsilsesquioxane particulates were prepared substantially according to the same method as in Example 1, except that phenyltrimethoxysilane was used instead of methyltrimethoxysilane, and the properties of the prepared polyalkylsilsesquioxane particulates were measured according to conventional methods and the results are listed in the following Table 1.

Example 8

The polyalkylsilsesquioxane particulates were prepared substantially according to the same method as in Example 1, except that methyltriethoxysilane was used instead of methyltrimethoxysilane, and the properties of the prepared polyalkylsilsesquioxane particulates were measured according to conventional methods and the results are listed in the following Table 1.

Example 9

The polyalkylsilsesquioxane particulates were prepared substantially according to the same method as in Example 1, except that a mixture of methyltrimethoxysilane and phenyltrimethoxysilane was used, and the properties of the prepared polyalkylsilsesquioxane particulates were measured according to conventional methods and the results are listed in the following Table 2.

Example 10

The polyalkylsilsesquioxane particulates were prepared substantially according to the same method as in Example 9, except that vinyltrimethoxysilane was used instead of methyltrimethoxysilane, and the properties of the prepared polyalkylsilsesquioxane particulates were measured according to conventional methods and the results are listed in the following Table 2.

Example 11

The polyalkylsilsesquioxane particulates were prepared substantially according to the same method as in Example 3, except that phenyltrimethoxysilane was used instead of methyltrimethoxysilane, and the properties of the prepared polyalkylsilsesquioxane particulates were measured according to conventional methods and the results are listed in the following Table 2.

Example 12

The polyalkylsilsesquioxane particulates were prepared substantially according to the same method as in Example 3, except that methyltriethoxysilane was used instead of methyltrimethoxysilane, and the properties of the prepared polyalkylsilsesquioxane particulates were measured according to conventional methods and the results are listed in the following Table 2.

Comparative Example 1

The polyalkylsilsesquioxane particulates were prepared substantially according to the same method as in Example 1, except that the alkoxytrialkylsilane was not used after the polycondensation reaction, and the properties of the prepared polyalkylsilsesquioxane particulates were measured according to conventional methods and the results are listed in the following Table 2.

Comparative Example 2

The polyalkylsilsesquioxane particulates were prepared substantially according to the same method as in Example 2, except that the alkoxytrialkylsilane was not used after the polycondensation reaction, and the properties of the prepared polyalkylsilsesquioxane particulates were measured according to conventional methods and the results are listed in the following Table 2.

Comparative Example 3

The polyalkylsilsesquioxane particulates were prepared substantially according to the same method as in Example 7, except that the alkoxytrialkylsilane was not used after the polycondensation reaction, and the properties of the prepared polyalkylsilsesquioxane particulates were measured according to conventional methods and the results are listed in the following Table 2.

Comparative Example 4

The polyalkylsilsesquioxane particulates were prepared substantially according to the same method as in Example 8, except that the alkoxytrialkylsilane was not used after the polycondensation reaction, and the properties of the prepared polyalkylsilsesquioxane particulates were measured according to conventional methods and the results are listed in the following Table 2.

Comparative Example 5

The polyalkylsilsesquioxane particulates were prepared substantially according to the same method as in Example 1, except that 10.5 parts by weight of trimethylmethoxysilane was used after the polycondensation reaction, and the properties of the prepared polyalkylsilsesquioxane particulates were measured according to conventional methods and the results are listed in the following Table 3.

Comparative Example 6

The polyalkylsilsesquioxane particulates were prepared substantially according to the same method as in Comparative Example 5, except that 10.5 parts by weight of vinylmethylmethoxysilane was used instead of trimethylmethoxysilane after the polycondensation reaction, and the properties of the prepared polyalkylsilsesquioxane particulates were measured according to conventional methods and the results are listed in the following Table 3.

TABLE 1

| Steps | Ingredients | Example 1 | Example 2 | Example 3 | Example 4 | Example 5 | Example 6 | Example 7 | Example 8 |
|---|---|---|---|---|---|---|---|---|---|
| 1st step | Methyltrimethoxysilane (parts by weight) | 600 | — | 600 | — | 600 | — | — | — |
|  | Vinyltrimethoxysilane (parts by weight) | — | 600 | — | 600 | — | 600 | — | — |
|  | Phenyltrimethoxysilane (parts by weight) | — | — | — | — | — | — | 600 | — |
|  | Methyltriethoxysilane | — | — | — | — | — | — | — | 600 |

TABLE 1-continued

| Steps | Ingredients | Example 1 | Example 2 | Example 3 | Example 4 | Example 5 | Example 6 | Example 7 | Example 8 |
|---|---|---|---|---|---|---|---|---|---|
| | (parts by weight) | | | | | | | | |
| | Acetic acid (parts by weight) | 0.3 | 0.3 | 0.3 | 0.3 | 0.3 | 0.3 | 0.3 | 0.3 |
| | Ion-exchanged water (parts by weight) | 950 | 950 | 950 | 950 | 950 | 950 | 950 | 950 |
| | pH | 2~4 | 2~4 | 2~4 | 2~4 | 2~4 | 2~4 | 2~4 | 2~4 |
| $2^{nd}$ step | 29% Aqueous ammonia (parts by weight) | 20 | 20 | 20 | 20 | 20 | 20 | 20 | 20 |
| | Ion-exchanged water (parts by weight) | 1700 | 1700 | 1700 | 1700 | 1700 | 1700 | 1700 | 1700 |
| | pH | 9~12 | 9~12 | 9~12 | 9~12 | 9~12 | 9~12 | 9~12 | 9~12 |
| | Reaction temperature (° C.) | 35 | 35 | 35 | 35 | 5 | 5 | 35 | 35 |
| $3^{rd}$ step | Trimethylmethoxysilane (parts by weight) | 3.8 | 3.8 | — | — | 3.8 | 3.8 | 3.8 | 3.8 |
| | Vinylmethylmethoxysilane (parts by weight) | — | — | 3.8 | 3.8 | — | — | — | — |
| Prepared particulates | Shape | Real spherical | Real spherical | Real spherical | Real spherical | Real spherical | Real spherical | Real spherical | Real spherical |
| | Dry weight (parts by weight) | 155 | 153 | 154 | 153 | 150 | 151 | 155 | 151 |
| | Yield (mol %) | 99.7 | 98.5 | 99.3 | 98.8 | 99.5 | 99.3 | 99.4 | 99.6 |
| | Average diameter (μm) | 2.3 | 2.6 | 3.1 | 2.8 | 11.5 | 12.7 | 2.5 | 2.2 |
| | C.V. (%) | 20.5 | 15.7 | 23.1 | 16.5 | 14.3 | 22.7 | 16.8 | 12.3 |
| | Real specific gravity | 1.3 | 1.3 | 1.3 | 1.3 | 1.3 | 1.3 | 1.3 | 1.3 |
| | Moisture content (%) | 0.3 | 0.5 | 0.7 | 0.4 | 0.4 | 0.3 | 0.4 | 0.5 |
| | Si—OH content (%) | 0.5 | 1.2 | 0.8 | 1.3 | 0.7 | 1.0 | 0.3 | 0.5 |
| | Thermogravimetric change rate at 400° C. (%) | 1.4 | 2.5 | 2.2 | 2.7 | 1.8 | 2.3 | 0.9 | 6.1 |

TABLE 2

| Steps | Ingredients | Example 9 | Example 10 | Example 11 | Example 12 | Comparative Example 1 | Comparative Example 2 | Comparative Example 3 | Comparative Example 4 |
|---|---|---|---|---|---|---|---|---|---|
| $1^{st}$ step | Methyltrimethoxysilane (parts by weight) | 300 | — | — | — | 600 | — | — | — |
| | Vinyltrimethoxysilane (parts by weight) | — | 300 | — | — | — | 600 | — | — |
| | Phenyltrimethoxysilane (parts by weight) | 300 | 300 | 600 | — | — | — | 600 | — |
| | Methyltriethoxysilane (parts by weight) | — | — | — | 600 | — | — | — | 600 |
| | Acetic acid (parts by weight) | 0.3 | 0.3 | 0.3 | 0.3 | 0.3 | 0.3 | 0.3 | 0.3 |
| | Ion-exchanged water (parts by weight) | 950 | 950 | 950 | 950 | 950 | 950 | 950 | 950 |
| | pH | 2~4 | 2~4 | 2~4 | 2~4 | 2~4 | 2~4 | 2~4 | 2~4 |
| $2^{nd}$ step | 29% Aqueous ammonia (parts by weight) | 20 | 20 | 20 | 20 | 20 | 20 | 20 | 20 |
| | Ion-exchanged water (parts by weight) | 1700 | 1700 | 1700 | 1700 | 1700 | 1700 | 1700 | 1700 |
| | pH | 9~12 | 9~12 | 9~12 | 9~12 | 9~12 | 9~12 | 9~12 | 9~12 |
| | Reaction temperature (° C.) | 35 | 35 | 35 | 35 | 35 | 35 | 35 | 35 |
| $3^{rd}$ step | Trimethylmethoxysilane (parts by weight) | 3.8 | 3.8 | — | — | — | — | — | — |
| | Vinylmethylmethoxysilane (parts by weight) | — | — | 3.8 | 3.8 | — | — | — | — |
| Prepared particulates | Shape | Real spherical | Real spherical | Real spherical | Real spherical | Real spherical | Real spherical | Real spherical | Real spherical |
| | Dry weight (parts by weight) | 155 | 153 | 154 | 153 | 122 | 121 | 122 | 121 |
| | Yield (mol %) | 99.7 | 98.5 | 99.3 | 98.8 | 78.4 | 77.6 | 78.4 | 77.6 |
| | Average diameter (μm) | 2.3 | 2.6 | 3.1 | 2.8 | 2.1 | 2.2 | 1.8 | 1.9 |
| | C.V. (%) | 20.5 | 15.7 | 23.1 | 16.5 | 16.8 | 20.3 | 22.7 | 17.3 |
| | Real specific gravity | 1.3 | 1.3 | 1.3 | 1.3 | 1.3 | 1.3 | 1.3 | 1.3 |
| | Moisture content (%) | 0.3 | 0.5 | 0.7 | 0.4 | 1.2 | 1.3 | 1.3 | 1.5 |
| | Si—OH content (%) | 0.5 | 1.2 | 0.8 | 1.3 | 5.2 | 5.9 | 4.6 | 5.1 |
| | Thermogravimetric change rate at 400° C. (%) | 1.1 | 1.3 | 0.8 | 2.7 | 4.8 | 6.1 | 2.8 | 4.9 |

TABLE 3

| Steps | Ingredients | Comparative Example 5 | Comparative Example 6 |
|---|---|---|---|
| 1st step | Methyltrimethoxysilane (parts by weight) | 600 | 600 |
| | Vinyltrimethoxysilane (parts by weight) | — | — |
| | Phenyltrimethoxysilane (parts by weight) | — | — |
| | Methyltriethoxysilane (parts by weight) | — | — |
| | Acetic acid (parts by weight) | 0.3 | 0.3 |
| | Ion-exchanged water (parts by weight) | 950 | 950 |
| | pH | 2~4 | 2~4 |
| 2nd step | 29% Aqueous ammonia (parts by weight) | 20 | 20 |
| | Ion-exchanged water (parts by weight) | 1700 | 1700 |
| | pH | 9~12 | 9~12 |
| | Reaction temperature (° C.) | 35 | 35 |
| 3rd step | Trimethylmethoxysilane (parts by weight) | 10.5 | — |
| | Vinylmethylmethoxysilane (parts by weight) | — | 10.5 |
| Prepared particulates | Shape | Indeterminate gels were formed | Indeterminate gels were formed |
| | Dry weight (parts by weight) | | |
| | Yield (mol %) | | |
| | Average diameter (μm) | | |
| | C.V. (%) | | |
| | Real specific gravity | | |
| | Moisture content (%) | | |
| | Si—OH content (%) | | |
| | Thermogravimetric change rate at 400° C. (%) | | |

As shown in Tables 1 and 2, it can be known that the moisture content and the content of the surface silanol groups in the examples of the present invention are low in comparison with the comparative examples that did not include an end-capping process with alkoxytrialkylsilane.

EXPERIMENTAL EXAMPLES

Water Repellency Test

The water repellency of the particulates was tested by using the characteristics that the dispersibility of the hydrophobic polyalkylsilsesquioxane particulates varies with the concentration of the organic solvent. Namely, the water repellency was tested in the conditions of weak agitation (at 100 rpm for 1 minute) and strong agitation (at 300 rpm for 1 minute) by introducing the polyalkylsilsesquioxane particulates prepared by the examples and comparative examples into a water/methanol aqueous solution having a concentration represented in Table 4, and the results are listed in the following Table 4.

TABLE 4

| Items | 100% Water | | 10% (v/v) Aqueous methanol solution 10% | | 20% (v/v) Aqueous methanol solution | | 30% (v/v) Aqueous methanol solution | |
|---|---|---|---|---|---|---|---|---|
| | weak agitation | strong agitation | weak agitation | strong agitation | weak agitation | strong agitation | weak agitation | strong agitation |
| Example 1 | ○ | ○ | ○ | ○ | ○ | ○ | ○ | |
| Example 2 | ○ | ○ | ○ | ○ | ○ | ○ | ○ | |
| Example 3 | ○ | ○ | ○ | ○ | ○ | | | x |
| Example 4 | ○ | ○ | ○ | ○ | ○ | | | x |
| Example 5 | ○ | ○ | ○ | ○ | ○ | ○ | | |
| Example 6 | ○ | ○ | ○ | ○ | ○ | ○ | ○ | |
| Example 7 | ○ | ○ | ○ | ○ | ○ | ○ | ○ | |
| Example 8 | ○ | ○ | ○ | ○ | ○ | ○ | | |
| Example 9 | ○ | ○ | ○ | ○ | ○ | | | |
| Example 10 | ○ | ○ | ○ | ○ | ○ | ○ | | |
| Example 11 | ○ | ○ | ○ | ○ | ○ | ○ | ○ | ○ |
| Example 12 | ○ | ○ | ○ | ○ | ○ | | | |
| Comparative Example 1 | ○ | ○ | | x | x | x | x | x |
| Comparative Example 2 | ○ | ○ | x | x | x | x | x | x |
| Comparative Example 3 | ○ | ○ | ○ | | | x | x | x |
| Comparative Example 4 | ○ | ○ | x | x | x | x | x | x |
| Comparative Example 5 | Cannot be tested. | | | | | | | |
| Comparative Example 6 | Cannot be tested. | | | | | | | |

Valuation bases for the results of water repellency test
○: the case that the particulates were not dispersed in water or aqueous solution at all.
: the case that the particulates were partially dispersed in water or aqueous solution.
x: the case that the particulates were totally dispersed in water or aqueous solution.

As shown Table 4, it can be known that the water repellency of the examples of the present invention is superior to that of the comparative examples.

While this invention has been explained in connection with the preferable embodiments, it is to be understood that the present invention is not limited to the disclosed embodiments, but, on the contrary, is possible to cover various modifications and executions within the spirit and scope of the appended claims, the detailed description of the invention, and the appended drawings, and is clearly included in the scope of the present invention.

What is claimed is:

1. A method of preparing polyalkylsilsesquioxane particulates having moisture content of 0.3 to 0.7% and the coefficient of variation (CV) of 12.3 to 23.1%, comprising the following steps:
   a first step of preparing an alkylsilanetriol represented by Chemical Formula 2 or a partial hydrolysate thereof by hydrolyzing an alkyltrialkoxysilane represented by Chemical Formula 1;
   a second step of preparing polyalkylsilsesquioxane particulates having silanol groups on their surface by polycondensing the alkylsilanetriol or the partial hydrolysate thereof; and
   a third step of end-capping the silanol groups with alkyl groups by adding an alkoxytrialkylsilane selected from the group consisting of the compounds represented by Chemical Formula 3 into a suspension of the polyalkylsilsesquioxane particulates having the silanol groups on their surface to prepare the polyalkylsilsesquioxane particulates, $R-Si-(OR^1)_3$  Chemical Formula 1

$R-Si-(OH)_3$  Chemical Formula 2

$R^2O-Si-(R^3)_3$  Chemical Formula 3 wherein
   R and $R^3$ are respectively a non-hydrolyzable group, which is a $C_1$-$C_{20}$ alkyl group, a $C_1$-$C_{20}$ alkyl group having a (meth)acryloyloxy group or an epoxy group, a $C_2$-$C_{20}$ alkenyl group, a $C_6$-$C_{20}$ aryl group, or a $C_7$-$C_{20}$ aralkyl group, and
   $R^1$ and $R^2$ are respectively a $C_1$-$C_6$ alkyl group,
   wherein the hydrolysis reaction of the first step is carried out in the presence of one or more organic acids selected from the group consisting of sulfuric acid, formic acid, acetic acid, propionic acid, oxalic acid, and citric acid.

2. The method according to claim 1, wherein the polyalkylsilsesquioxane particulates contains silanol groups in an amount of 5% or less.

3. The method according to claim 1, wherein the alkyltrialkoxysilane compound of Chemical Formula 1 is an alkyltrialkoxysilane having a $C_1$-$C_{20}$ alkyl group or a $C_2$-$C_{20}$ alkenyl group.

4. The method according to claim 1, wherein the alkoxytrialkylsilane compound of Chemical Formula 3 is an alkoxytrialkylsilane having a $C_1$-$C_{20}$ alkyl group or a $C_2$-$C_{20}$ alkenyl group.

5. The method according to claim 1, wherein the alkoxytrialkylsilane of the third step is used in an amount of from 0.1 to 10 parts by weight per 100 parts by weight of the alkyltrialkoxysilane compound of Chemical Formula 1.

6. The method according to claim 1, wherein the polycondensation reaction of the second step is carried out in the presence of one or more base catalysts selected from the group consisting of potassium hydroxide, sodium hydroxide, lithium hydroxide, calcium hydroxide, barium hydroxide, potassium carbonate, sodium carbonate, monomethylamine, dimethylamine, monoethylamine, diethylamine, ethylenediamine, and ammonia.

7. The method according to claim 1, wherein the hydrolysis reaction of the first step and the polycondensation reaction of the second step are carried out at a temperature of from 5 to 30° C.

8. The method according to claim 7, wherein the average diameter of the polyalkylsilsesquioxane particulates is from 10 to 30 μm.

9. The method according to claim 1, wherein the hydrolysis reaction of the first step and the polycondensation reaction of the second step are carried out at a temperature of from 30 to 40° C.

10. The method according to claim 9, wherein the average diameter of the polyalkylsilsesquioxane particulates is from 1 to 10 μm.

11. Polyalkylsilsesquioxane particulates containing silanol groups in an amount of 5% or less, having moisture content of 0.3 to 0.7% and the coefficient of variation (CV) of 12.3 to 23.1%.

12. The polyalkylsilsesquioxane particulates according to claim 11, prepared by a method comprising:
   preparing an alkylsilanetriol represented by Chemical Formula 2 or a partial hydrolysate thereof by hydrolyzing an alkyltrialkoxysilane represented by Chemical Formula 1;
   preparing polyalkylsilsesquioxane particulates having silanol groups on their surface by polycondensing the alkylsilanetriol or the partial hydrolysate thereof; and
   end-capping the silanol groups with alkyl groups by adding an alkoxytrialkylsilane selected from the group consisting of the compounds represented by Chemical Formula 3 into a suspension of the polyalkylsilsesquioxane particulates having the silanol groups on their surface to prepare the polyalkylsilsesquioxane particulates, $R-Si-(OR^1)_3$  Chemical Formula 1

$R-Si-(OH)_3$  Chemical Formula 2

$R^2O-Si-(R^3)_3$  Chemical Formula 3 wherein
   R and $R^3$ are respectively a non-hydrolyzable group, which is a $C_1$-$C_{20}$ alkyl group, a $C_1$-$C_{20}$ alkyl group having a (meth)acryloyloxy group or an epoxy group, a $C_2$-$C_{20}$ alkenyl group, a $C_6$-$C_{20}$ aryl group, or a $C_7$-$C_{20}$ aralkyl group, and
   $R^1$ and $R^2$ are respectively a $C_1$-$C_6$ alkyl group,
   wherein the hydrolysis reaction of the first step is carried out in the presence of one or more organic acids selected from the group consisting of sulfuric acid, formic acid, acetic acid, propionic acid, oxalic acid, and citric acid.

13. The polyalkylsilsesquioxane particulates according to claim 11, wherein the thermogravimetric change rate at 400° C. is 2.7% or less.

* * * * *